United States Patent
Eichler et al.

(10) Patent No.: US 8,986,762 B2
(45) Date of Patent: Mar. 24, 2015

(54) CAPSULE WITH FLOW CONTROL AND FILTERING MEMBER

(75) Inventors: Paul Eichler, Arnex-sur-Orbe (CH); Peter Koch, Orbe (CH); Francisco Campiche, Campinas-SP (BR); Pierre Monnier, Arnex-sur-Orbe (CH)

(73) Assignee: Nestec S.A., Vevey (CH)

( * ) Notice: Subject to any disclaimer, the term of this patent is extended or adjusted under 35 U.S.C. 154(b) by 133 days.

(21) Appl. No.: 12/922,255

(22) PCT Filed: Jan. 5, 2009

(86) PCT No.: PCT/EP2009/050034
§ 371 (c)(1),
(2), (4) Date: Sep. 13, 2010

(87) PCT Pub. No.: WO2009/112291
PCT Pub. Date: Sep. 17, 2009

(65) Prior Publication Data
US 2011/0020500 A1  Jan. 27, 2011

(30) Foreign Application Priority Data

Mar. 12, 2008  (EP) .................................. 08152626

(51) Int. Cl.
B65B 29/02 (2006.01)
B65D 85/804 (2006.01)
A47J 31/36 (2006.01)

(52) U.S. Cl.
CPC ......... B65D 85/8043 (2013.01); A47J 31/3695 (2013.01)
USPC ................................ 426/77; 426/79; 99/295

(58) Field of Classification Search
USPC ...................... 426/84, 433; 99/295
See application file for complete search history.

(56) References Cited

U.S. PATENT DOCUMENTS

| 4,136,202 A | 1/1979 | Favre |
| 5,242,702 A | 9/1993 | Fond |

(Continued)

FOREIGN PATENT DOCUMENTS

| CA | 2067515 | 11/1992 |
| CH | 605293 | 9/1978 |

(Continued)

OTHER PUBLICATIONS

IARC Mongraphs on the Evaluation of Carcinogenic Risks to Humans, vol. 51 p. 47, World Health Organization International Agency for Research on Cancer, 1991 no month given.*

(Continued)

*Primary Examiner* — Rena L Dye
*Assistant Examiner* — Chaim Smith
(74) *Attorney, Agent, or Firm* — K&L Gates LLP

(57) ABSTRACT

A sealed capsule contains a beverage ingredient in powder form, in particular, ground coffee. The capsule comprises a base body (4) and a foil member (5) tightly attached to the base body (4), the foil member (5) being made from a material allowing the production of a multitude of perforations in the foil member (5) when the foil member (5) is thrust, via the pressure caused by injecting a liquid or a liquid/gas mix into the capsule, against a relief plate of a beverage production machine, wherein the capsule is provided with a flow control porous member (80), the flow control porous member (80) being positioned between at least a portion of ingredients (3) and the foil member (5). The flow control porous member provides a faster and more consistent flow of the liquid extract through the capsule and significantly reduces the resurgence of non-soluble solids.

9 Claims, 12 Drawing Sheets

(56) References Cited

U.S. PATENT DOCUMENTS

| | | | |
|---|---|---|---|
| 5,402,707 A | 4/1995 | Fond et al. | |
| 5,472,719 A | 12/1995 | Favre | |
| 5,496,573 A * | 3/1996 | Tsuji et al. | 426/84 |
| 5,897,899 A * | 4/1999 | Fond | 426/112 |
| 6,068,871 A | 5/2000 | Fond et al. | |
| 8,202,560 B2 | 6/2012 | Yoakim et al. | |
| 2003/0056661 A1 | 3/2003 | Hu et al. | |
| 2003/0077359 A1 | 4/2003 | Fond et al. | |
| 2003/0217643 A1* | 11/2003 | Masek et al. | 99/279 |
| 2003/0222089 A1 | 12/2003 | Hale | |
| 2004/0115310 A1 | 6/2004 | Yoakim et al. | |
| 2006/0110507 A1* | 5/2006 | Yoakim et al. | 426/433 |
| 2006/0236871 A1* | 10/2006 | Ternite et al. | 99/295 |
| 2007/0148290 A1* | 6/2007 | Ternite et al. | 426/90 |
| 2009/0211458 A1 | 8/2009 | Denisart et al. | |

FOREIGN PATENT DOCUMENTS

| | | |
|---|---|---|
| CN | 1681425 | 10/2005 |
| CN | 101014513 | 8/2007 |
| CN | 101043835 | 9/2007 |
| EP | 0507905 | 10/1992 |
| EP | 0512468 | 11/1992 |
| EP | 0554469 | 8/1993 |
| EP | 0512470 | 4/1996 |
| EP | 1654966 | 5/2006 |
| EP | 1710173 | 10/2006 |
| EP | 1826148 | 8/2007 |
| FR | 1537031 | 6/1967 |
| FR | 2917723 | 12/2008 |
| JP | 62-002912 | 1/1987 |
| JP | 05-025307 | 2/1993 |
| JP | 05-032056 | 5/1993 |
| JP | 2004-533305 | 11/2004 |
| WO | 2006045536 | 5/2006 |
| WO | 2008155229 | 12/2008 |

OTHER PUBLICATIONS

PCT International Search Report for Application No. PCT/EP2009/050034 Mailing Date of Apr. 1, 2009, 7 Pages.
Written Opinion of the International Searching Authority / PCT/EP2009/050034 mailing date of Apr. 1, 2009—6 pages.

* cited by examiner

CAPSULE WITH FLOW CONTROL AND FILTERING MEMBER

BACKGROUND OF THE INVENTION

The present invention generally relates to capsules for containing beverage ingredients, to a beverage producing system for use in connection with such capsules as well as to methods for producing beverages on the basis of ingredients contained in such capsules.

The background of the present invention is the field of capsules which contain beverage or other comestible (e.g. soup) ingredients. By means of an interaction of these ingredients with a liquid, a beverage or other comestibles, such as for example soups, can be produced. The interaction can be for example an extraction, brewing, dissolution, etc. process. Such a capsule is particularly adapted to contain ground coffee in order to produce a coffee beverage by having hot water under pressure enter the capsule and draining a coffee beverage from the capsule.

FR 1537031 does not show separated capsules, but a blister pack containing coffee powder. As two foil members are sealed together at the top foil member in an area between two adjacent compartments, these compartments can not be separated from each other without loosing the tight seal between the foil members. A filter is arranged at the bottom of each compartment and thus opposite of the area where the two foil members are sealed. The outlet side of the compartment is opened by actively moving a perforation member, via a spring force, against the lower face of the compartment. Due to the blister pack technology the top face of the compartments has to be flat.

Also according to CH605293 a filter is, at its rim portion, sandwiched between the foil member and the capsule base body wall. The foil member is additionally provided with a weakened area and is not designed to be perforated by being thrust against a relief plate. The filter is used as a screen to avoid coffee grains from being delivered in the liquid.

EP0507905B1 relates to an apparatus and cartridge for preparing a liquid product. An internal filtering membrane is placed in the bottom of the cartridge for retaining solid particles in the cartridge and prevent clogging of the flow channels provided in the perforating members.

EP-A-512468 relates to a capsule for the preparation of a beverage wherein a filter paper is welded between the peripheral area of the cup and the tearable membrane. The filter paper is used only to ensure no coffee grains can exit the membrane when torn.

US2006/0236871A1 relates to a single portion cartridge which is suitable in particular for brewing a portion of a coffee beverage wherein a distributing and/or supporting structure is provided with at least one opening which is covered by a textile fabric forming a screen between the enclosure and the large outlet. The essential object of this invention is to minimize the escape of particles of the beverage substance from the cartridge during the brewing operation because a large opening is made in the bottom of the capsule body and the particles would be washed out in absence of such distributing structure. The textile fabric has a pore size in the range from 10 to 500 microns, preferably from 30 to 150 microns.

Systems and methods for obtaining fluid comestibles from substances containing isolated capsules are for example known from EP-A-512470 (counterpart of U.S. Pat. No. 5,402,707).

The capsule 200 as shown in FIG. 1 has a frustoconically-shaped cup which may be filled e.g. with roasted and ground coffee 300 and which is closed by a foil-like tear face cover 400 welded and/or crimped to a flange-like rim 140 which extends laterally from the side-wall of cup. A capsule holder 130 comprises a flow grid 120 with relief surface element members.

The capsule holder 130 can be accommodated in a larger support 150 which has a lateral wall 240 and a beverage outlet 270 for the passage of extracted coffee beverage.

As can be seen from FIG. 1 the extraction system further comprises a water injector 700 having water inlet channel(s) 201 and an annular element 800 with an internal recess of which the shape substantially corresponds to the outer shape of the capsule. On its outer part, the annular member 800 comprises a spring 220 holding a ring 230 for releasing the capsule on completion of extraction.

In operation, a capsule 200 is placed on the capsule holder 130. The water injector 700 perforates the upper face of the cup. The lower tear face 400 of the capsule rests on the radially arranged members of the capsule holder 130.

The water is injected through the channel 201 of the water injector 700 and impinges on the bed 300 of coffee. The pressure in the capsule increases and the tear face 400 increasingly follows the shape of the radial opening relief members. Such radial opening relief members could be replaced by pyramid-shaped reliefs or other shapes of relief. When the constituent material of the tear face reaches its breaking stress, the tear face tears along the relief members. The extracted coffee flows through the orifices of the flow grid 120 and is recovered in a container (not shown) beneath the beverage outlet 270.

The principles of this extraction process as far as it can be maintained in connection with the present invention can be summarized as follows:

An initially gastightly sealed capsule is inserted in capsule holder means.

The capsule holder means is then introduced associated to the water injection means of the machine such that an annular element surrounds the sealed capsule. In a first wall of the capsule at least one opening is generated.

Water entering the capsule through the opening in the first wall is interacting with the ingredients contained in the capsule while traversing the interior of the ingredient contained in the capsule and is then made to leave the capsule through at least one opening/perforation created in the second wall under the effect of the pressure building up in the capsule.

The perforations in the second face, especially when cooperating with the relief members, filter the beverage leaving the interior of the capsule so that non-soluble coffee particles remain in the capsule. It has been considered in the prior art that such filtering is sufficient (see e.g. column 4 of EP512470B1).

EP 512468B1 teaches to have a capsule with a flat perforable foil member for delivery of the coffee. A filter paper can be sealed between the foil member and the rim of the base body. The capsule, i.e., the membrane opens under the sole effect of the pressure in the capsule.

Also according to CH605293 a filter is, at its rim portion, sandwiched between the foil member and the capsule base body wall. The foil member is additionally provided with a weakened area and is not designed to be perforated by being thrust against a relief plate.

The invention has found that, according to the teaching of the prior art, when a sealed gastight capsule with a simple perforable foil member is placed against a capsule holder with a multitude of small reliefs, and in particular, small squared or rectangular perforation elements, one may have the following problems:

The extraction process may be slowed down, in particular for capsules containing a larger dose of coffee designed for delivering coffee beverages, The extraction process may flow at inconsistent flow times from one capsule to another, The extraction is not clean enough and coffee particles can escape the capsule through the small perforations created through the foil member after extraction, when the capsule is removed from the machine in particular, due to the presence of fine grinding outside the typical range designed for the current system (e.g., below an average grind size of 200 microns).

These problems are targeted at by the present invention and is remedied by means of the features of the independent claims. The dependent claims further develop the central idea of the invention.

BRIEF SUMMARY OF THE INVENTION

According to a first aspect, the invention relates to a capsule for use in a beverage production machine comprising:
means for perforating an inlet side of the body of the capsule opposed to the foil member and the flange-like rim and injecting a liquid or a liquid/gas mixture into the capsule,
a relief plate with a multitude of relief elements which relief plate is arranged in the machine such that the injection pressure thrusts the foil member against the relief plate,
the capsule comprising:
a base body sealed off by a foil member tightly attached to the flange-like rim of the base body,
the foil member being made from a material which is then perforated by the relief plate to form a multitude of openings when the pressure of the injected liquid or liquid/gas mixture reaches a value of at least 4 bar, wherein the capsule further comprises a flow control porous member arranged between at least a portion of ingredients in the capsule and the foil member.

The capsule is thus provided with a flow control and filtering member called "flow control porous member" in the rest of the description. The flow control porous member is positioned between at least a portion of ingredients and the foil member.

As a result, the flow was significantly faster and more consistent than for the flow of a capsule of the prior art, i.e., comprising no such flow control porous member.

In particular, it was measured that the flow time could be up to 25% shorter of the mean flow time without significantly changing the quality of the coffee liquid extract. A four times smaller flow time standard deviation was also surprisingly noticed when comparing the mean flow time of a plurality of capsules. Finally, the ground coffee was successfully retained in the capsule with reduced coffee solid resurgences through the perforated membrane.

The flow control porous member may be positioned between the ingredients and the plane defined by the ring-shaped sealing area between the foil member and the rim of the base body.

The base body of the capsule may comprise a rim onto which the foil member is sealed at an annular sealing area. The rim of the base body may further extend outwardly by a curled end.

The base body and/or the foil member can be made from aluminum or aluminum alloy or a laminate of aluminium or aluminium alloy and polymer The flow control porous member may be connected to the capsule in being sandwiched, in the sealed area, between the rim of the base body and the foil member.

The flow control porous member may have a higher rigidity in flexure than the foil member so that the member deforms less under pressure than the foil member against the relief elements. A lower deformation (or a differential of deformation) provides space between the member and the foil member during extraction allowing the beverage, e.g., liquid coffee extract to better flow between the perforated openings and the relief elements. This results in a faster flow of the liquid through the foil member without affecting significantly the strength of the liquid extract (i.e., total solid content, yield). A higher rigidity can be obtained by a porous member being thicker than the foil member and/or being made of more rigid material.

In particular, the flow control porous member thickness may be between 0.1 microns and 1.5 mm. Preferably, the flow control porous member thickness is between 0.4 microns and 1.0 mm.

The foil member of the capsule is configured to be successfully torn against a multitude of relief elements by a relief plate of the beverage production device. The foil member must be designed to tear in a consistent manner, in particular, when a predetermined threshold of pressure in the capsule is reached. Therefore, the design of the foil member and the design of the relief plate of the device are determined in such a way that the opening/tearing of the foil member is reliably and consistently carried out.

Therefore, preferably, the foil member has a thickness of between 10 and 100 microns, more preferably between 15 and 45 microns. Most preferably, the foil member thickness is of about 30 microns plus or minus the typical manufacturing tolerances (e.g., +/−5 microns). Furthermore, the foil member is preferably made of aluminium or aluminium alloy.

Preferably, the ratio of flow control porous member thickness to the foil member thickness is comprised between 1.5:1.0 and 50:1, most preferably between 5:1 and 20:1.

The flow control porous member may be positioned in the capsule in a manner separate from the capsule walls, i.e., disconnected from the walls. For instance, the flow control porous member may be loosely inserted between the ingredients and the foil member.

The flow control porous member can cover at least 62% of the total inner surface of the foil member to ensure that it covers most of the openings created through the foil member when torn under pressure and thus prevents a flow bypass effect and so a reduction of the efficiency of the flow control.

In an advantageous mode, the flow control member has a square or rectangular shape. Hence, the cost of production of the flow control member can be significantly reduced with significantly less material scraps during cutting in the sheet or laminate.

In another mode, the flow control porous member may be connected to the walls of the base body of the capsule and/or to the foil member. The flow control porous member can be connected to the wall by sealing or other connection modes such as mechanical engagement e.g., clipsing.

In certain modes, the flow control member is a thin porous membrane of polymeric material.

In other modes, the porous member comprises essentially polymeric fibre-containing material.

The flow control porous member may be made from a non-woven material. The flow control porous member may also be made from a woven material. The porous member can be formed of food-grade meltable polymeric fibres.

In a preferred mode, the porous member comprises microfibres of diameter of less than 20 microns.

In a mode, the porous member comprises a melt blown (MB) microfibres-containing material.

The porous member can be selected within the group consisting of: polypropylene, polyethylene, polybutyleneterephtalate (PBT), polycarbonate, poly(4-methyl pentene-1), polyurethane, polyethyleneterephtalate (PET), polyethersulfone, polyamide, resin bonded-glass fibres and combinations thereof.

The porous member can also comprise fibres of a diameter higher than 20 microns. For example, blends of microfibres and larger diameter fibres can form the porous member. For example, a porous member can be formed of melt blown (MB) and/or spunbond (SB) material.

In possible modes, the flow control porous member may be a solid injected plastic plate with small flow control openings.

Preferably, the flow control porous member has a pore size (i.e. average opening diameter) comprised between 0.4 and 100 microns. Particularly good results on flow time reduction were obtained with a flow control porous member with a pore size of between 0.4 and 25 microns. The pore size may be lower than 10 microns, even lower than 2 microns, i.e., between 0.4 and 2 microns. Flow time reduction was also obtained with ground coffee having a particle size ($D_{4,3}$) comprised between 190 and 400 microns.

A flow time of less than 40 seconds, with a standard deviation of less than 15 seconds, was successfully obtained, from a capsule containing about 5.5 grams of ground coffee, for delivering a coffee liquid extract of 40 g corresponding to an espresso coffee with a total solid content between 2.7 and 3.8% in weight. Similarly, a flow time of less than 30 seconds, with a standard deviation of less than 5 seconds, was successfully obtained, from a capsule containing about 6 grams of ground coffee, for delivering a coffee liquid extract of 110 g corresponding to a lungo coffee with a total solid content between 1.1 and 1.5% in weight.

It was also observed that the flow time was significantly lowered when the ground coffee particle size is increased.

The flow control porous member may be, at its rim, sandwiched between the foil member and the capsule walls.

The flow control porous member may be distanced from the foil member. In a possible mode, the flow control porous member may transversally separate two portions of ingredients, in particular, two portions of ground coffee.

In a possible mode, the two portions of ground coffee have different brewing characteristics. The brewing properties may refer, in relation to each of said portions, to the mass, the volume, the tap density, the average particle size ($D_{4,3}$), the type of blend, the degree of roasting and combinations thereof. In one mode, the upstream portion of ground coffee portion comprises a mass of ground coffee which has a lower average particle size $D_{4,3}$, than the downstream portion of ground coffee. The upstream portion of ground coffee may be of a higher volume or smaller volume than the downstream portion. In another mode, the upstream portion of ground coffee portion comprises a mass of ground coffee which has a higher average particle size $D_{4,3}$, than the downstream portion of ground coffee. Again, the upstream portion of ground coffee may be of a higher volume or smaller volume than the downstream portion. These variations enable to tune the flow characteristics in the capsule and also to tailor different characteristics (TC, yield, crema) of the delivered coffee extract to the various consumer's preference.

The flow control porous member may be placed adjacent to the foil member in the capsule. A small space may be allowed between the porous member and the foil member due to the deformation differential between the two elements. Indeed, due to its lower rigidity the foil member deforms more to a convex shape under the pressure of gas (e.g., carbon dioxide) inside the sealed capsule and a small gap may form between the foil member and the porous member.

The flow control porous member may be attached to the inner side of the foil member. In particular, the flow control porous member may be welded to the inner surface of the foil member. In another mode, in order to reduce the thickness of the flow control, the porous member may be printed directly on the inner surface of the foil member.

The flow control porous member may be thicker than the foil member, preferably at least 1.5 times thicker than the foil member.

In possible modes, the flow control porous member may be flat or corrugated. The flow control porous member may also comprise, for example, channels and/or protruding zones that promote a collection gap for the beverage between the foil member and the flow porous member.

The foil member may be free of weakened areas before being inserted in a beverage production machine.

The foil member may be a continuous sheet of metal or polymer or a laminate of metal and polymer.

The flow control porous member may be positioned and arranged such that it is not sandwiched between the foil member and the rim of the base body. For instance, the flow control porous member may be placed loosely in the capsule or may be attached in a localized area onto the inner surface of the foil member and with the edge of the flow control porous member being at a distance from the sealing area of the foil member and base body.

The outer edge of the flow control porous member may end at a position radially inwards from the sealing area of the foil member and the rim of the base body.

In another embodiment, the flow control porous member and the tearable foil member form a multilayer laminate.

The multilayer laminate preferably comprises:
a tearable flexible layer of aluminium or of another metal or of polymer or a multilayer of aluminium and polymer or a multilayer of polymers and,
at least one porous polymeric layer.

The porous polymeric layer forms the flow control porous member of the capsule. The metal layer preferably forms a gas barrier in the laminate. One or more additional non-porous layers can be associated to the metal layer in order to reduce the thickness of the metal layer and/or form a gas barrier. The gas barrier can also be obtained by a polymer layer of the tearable foil member such as EVOH when it is made of a multilayer of polymers.

Preferably, the flow control porous member resists to the tearing by the relief member when the foil member is torn by the relief member under the pressurized extraction condition.

Therefore, in the laminate, the porous polymeric layer, e.g., the thin membrane, has preferably greater elastic properties than the tearable layer.

Hence, during extraction, the multilayer laminate has the ability to deform against the relief plate causing tearing of the non-porous layer(s) to form a multitude of small openings and stretching or deforming without tearing of the porous layer(s). As a result, the flow control properties of the non-porous layer(s) are maintained when the liquid is allowed to pass through the delivery foil member of the capsule.

The porous polymeric layer is preferably a thin membrane or a non-woven layer. The layer can be made of a material chosen among the list of: polypropylene, polyethylene, PBT, PET, polyethersulfone and polyamide.

The porous layer has a pore size between 0.4 and 25 microns, more preferably between 0.4 and 2 microns.

The flexible layer for the laminate can be aluminium or another metal depending on the mechanical properties suitable for opening the capsule, on the gas barrier properties of the material and on the laminating technique.

A multilayer laminate facilitates the handling of the membrane during the production of the capsule. In particular, it reduces the risk for the fragile membrane of the porous member, to be damaged during handling, filling and/or sealing the capsule.

The laminate may be produced by any suitable method such as thermal lamination such as multilayer extrusion (co-extrusion), extrusion lamination, lamination moulding using heat rolls or heat press.

In another aspect, the invention relates to a capsule for use in a beverage production machine comprising:
 a base body,
 a perforable, non-porous foil member tightly attached to the base body,
 at least one porous layer between the ingredients in the capsule and the foil member;
wherein the porous layer forms with the perforable, non-porous foil member a multilayer laminate.

The multilayer laminate can comprise:
 a layer of aluminium or of another metal or of polymer or a multilayer of aluminium and polymer and,
 at least one porous polymeric layer.

The metal layer preferably forms a gas barrier of the laminate.

One or more additional non-porous layers can be laminated to the metal layer in order to reduce the thickness of the metal layer and/or form a gas barrier. The gas barrier can also be obtained by a polymer layer of the tearable foil member such as EVOH when it is made of a multilayer of polymers.

Another aspect of the invention relates to a method using a capsule according to any of the aforementioned features.

In particular, the method is for producing a beverage on the basis of an ingredient in a capsule, the method comprising the steps of:
 providing a capsule comprising a preferably frusto-conical base body sealed off by a foil member tightly attached to the flange-like rim of the base body,
 inserting the sealed capsule in a beverage production machine,
 perforating an inlet side of the capsule opposed to the foil member,
 injecting a liquid or a liquid/gas mixture into the capsule causing a pressure to build up in the capsule and the foil member to thrust against a fixed relief member of the beverage production machine,
the foil member being made from a material which is then perforated by a multitude of openings when the pressure of the injected liquid and liquid/gas mixture reaches a value of at least 4 bar,
 draining a beverage from the capsule, wherein the beverage passes between the multitude of openings and the relief member,
comprising the step of:
 filtering the beverage via a flow control porous member arranged between at least a portion of ingredients and the foil member.

In particular, said flow control porous member is effective for reducing the flow time and/or improve the flow time consistency, i.e., by reducing the flow time standard deviation of the mean flow time, when delivering a given volume of coffee extract compared to a capsule without said member. In particular, a standard deviation of less than 10% of the mean flow time can be obtained when delivering a coffee extract of 40 or 110 mL.

In general, the capsule contains a dose of between 5.5 to 6.5 grams of ground coffee. For short coffee, a dose of between 5.5 and 6.0 grams is preferred. For a lungo coffee, a dose of between 6.0 and 8.0 grams of coffee is preferred.

According to the method of the invention, a stronger lungo coffee can be obtained while maintaining an acceptable flow time, i.e., of less than about 40 seconds, more particularly, less than 35 seconds. In particular, a capsule for a stronger lungo contains above 6.0 grams of ground coffee, preferably between 6.2 and 7.0 grams.

Also, the capsule contains ground coffee having a particle size $D_{4,3}$ between 250 and 450 microns. The higher the particle size, the more reduced the flow time can be. Therefore, by tuning the particle size of the ground coffee, it is also possible to reach lower flow time while maintaining substantially the same strength of coffee or, alternatively, to increase the strength of the coffee (e.g., higher TC, Yield) without increasing the flow time.

According to the method of the invention, the flow time for delivering 40 mL of coffee extract is lower than 40 seconds, preferably lower than 30 seconds, most preferably lower than 25 seconds.

According to the method of the invention, the flow time for delivering 110 mL of coffee extract is lower than 40 seconds, more preferably lower than 30 seconds.

Preferably, the flow control porous member has a pore size comprised between 0.4 and 100 microns, preferably between 0.4 and 25 microns, most preferably, between about 0.45 and 2 microns.

Remarkable results have been obtained with a flow control porous member which is a thin porous membrane or a non-woven member. Remarkable results have also been obtained when the tearable foil member has a thickness of 15 and 45 microns, e.g., about 30 microns. The foil member is preferably in aluminium or aluminium alloy.

The fixed relief member of the beverage production device may comprise a tearing structure preferably configured to produce a grid-like perforation of the foil member.

For this, the fixed relief member of the beverage production device may comprise a tearing structure which has exclusively tearing edges forming angles of at least 80 degrees. In other words, the structure is free of sharp shape with angles formed of less than 80 degrees.

Preferably, the tearing structure comprises shapes of truncated pyramids and recesses forming a network of beverage collecting channels; which structure forms, as a result of thrust of the foil member against the fixed relief member, partial rectangular or squared imprints forming small discrete tears in the foil member. It is observed that the foil member tends to intimately deform to tear against the structure whereas the flow control porous member remains less deformed against such a structure and/or has a greater ability to elastically deform without tearing against said structure. The structure is also such (with no sharp edges like needles) that the risk of rupture of the porous member is low and that the porous member can be thin enough while providing its flow control properties.

Another aspect of the invention relates to the combination of a capsule and a beverage production machine according to any of the aforementioned features.

Further features, objects and advantages of the invention will become evident for the skilled person when reading the following detailed explanation of an embodiment of the invention when taken in conjunction with the figures of the enclosed drawings.

DETAILED DESCRIPTION OF THE INVENTION

Figure 1:
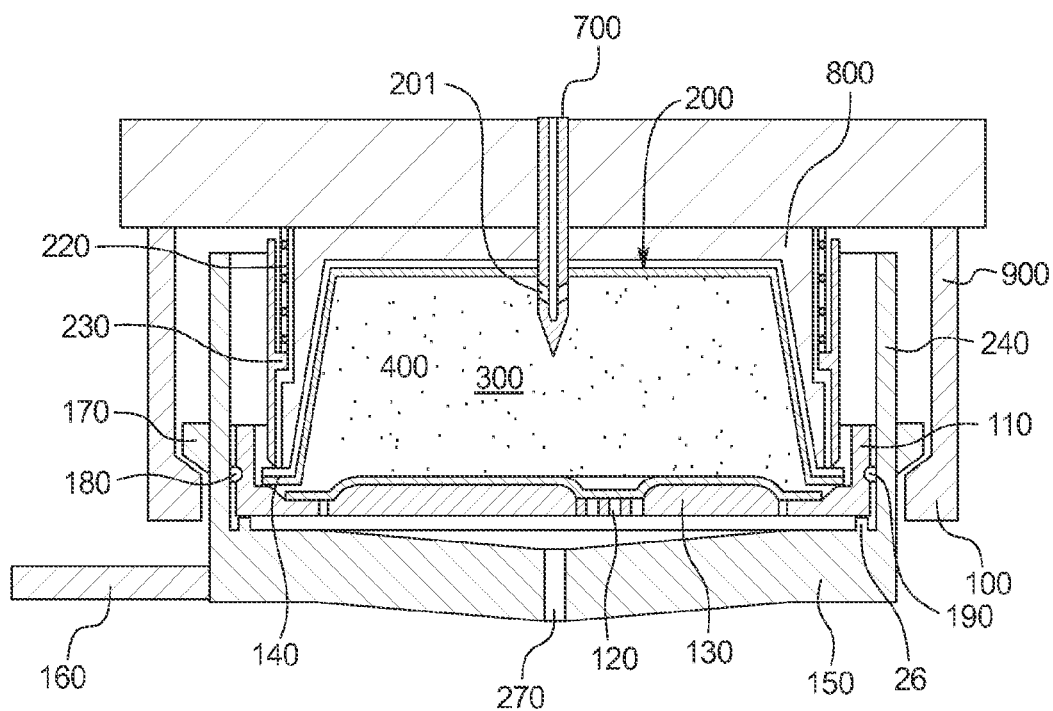
FIG. 1 shows a known beverage production device encasing a capsule with beverage ingredient.
Figure 2:
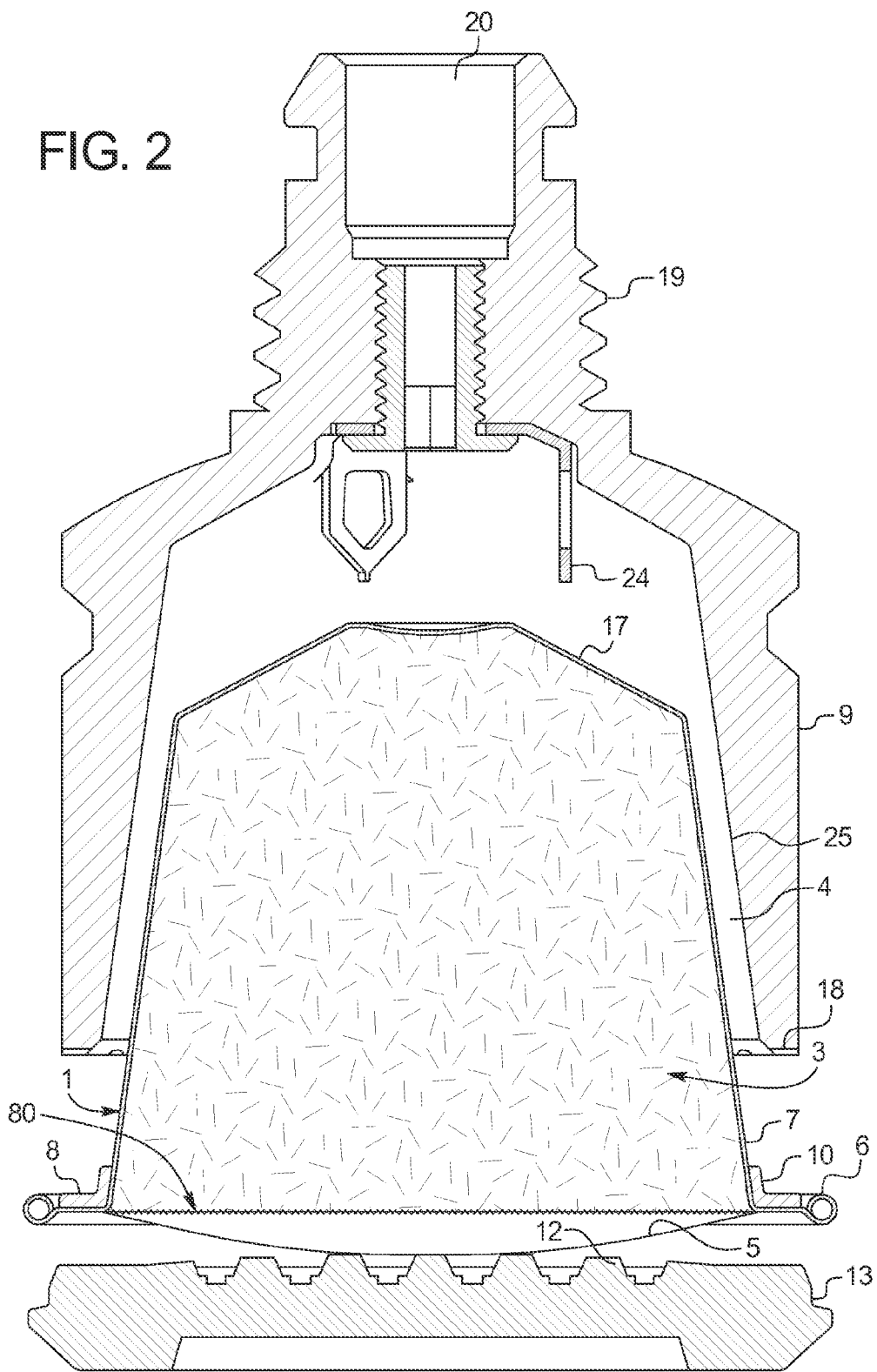
FIG. 2 shows an example of a capsule and a beverage production machine according to the present invention.

With reference to FIG. 2 now a first detailed embodiment of the capsule of the invention will be explained.

The "total solids" is defined as the weight of extracted solids contained in the extract divided by the total weight of the extract. This value is typically expressed in percentage.

The "extraction yield" refers to the character of the extract and it is defined as the weight of total solids in the liquid extract divided by the total weight of starting coffee ingredients in the cartridge (e.g., roast and ground coffee). This value is typically expressed as a percentage.

The average particle size "$D_{4,3}$" represents the mean volumetric diameter of the coffee grind as obtained by laser diffraction method using a Malvern® optical instrument and butanol as dispersing agent for the particles.

The "crema" is defined as the head of foam created on the coffee extract with a texture of substantially small bubbles.

The crema attribute can be measured by an empirical sugar test which consists in arranging a well defined crystal sugar layer (i.e., crystal sugar of $D_{4,3}$ of 660 microns of particle size) on top of a freshly prepared cup of coffee and measuring the elapsing time between the start of overlaying and the main part of sugar's sinking. The "sugar test value" is thus a number of seconds.

The "pressure of liquid or liquid/gas mixture" is typically a measure of relative pressure above atmospheric pressure taken at the injection site in the capsule.

Typically the pressure of liquid or liquid/gas mixture according to the process of the invention is of at least 4 bar for providing the tearing of the foil member during extraction, preferably of at least 6 bar, most preferably of at least 8 bar.

Note that in the following the invention will be explained referring to a certain design of a capsule, i.e. a design according to which the capsule comprises a cup-like base body and a closing foil member. Generally a capsule according to the present invention comprises at least two opposing wall members which are connected to each other at the edges to form a sealed flange-like rim area, thus enclosing a sealed interior.

Comparable to the prior art also this embodiment shows a capsule holder 13 having relief elements 12 which are designed to tear and perforate a foil member 5 closing off a cup-like base body 4 of the capsule 1. This tearing of the foil member can e.g. occur as soon as the pressure inside the capsule exceeds a threshold value. Note that the relief elements can have any protruding shape able to cause a (partial) tearing of the foil member, preferably of grid-like design. As an example pyramids, bumps, cylinders, elongated ribs are cited as preferred examples.

Within the capsule 1 ingredients 3 are contained, wherein the ingredients 3 are selected such that a beverage can be produced when having a liquid entering the capsule in the region of the top wall 17 of the capsule 1 and then interact which such ingredients 3. Preferred ingredients are e.g. ground coffee, tea or any other ingredients from which a beverage or other liquid or viscous comestible (e.g. soup) can be produced.

FIG. 2 shows a state in which such a capsule has been placed on a capsule holder 13, the foil member 5 resting on the relief element 12 side of the capsule holder 13 and the cup-like base body 4 of the capsule 1 being already partly surrounded by the circumferential wall 25 of an enclosing member 9 of the beverage production device. The shown enclosing member has the shape of a bell. Other shapes are viable, wherein the design of the interior contours (recess) of the enclosing member is generally adapted to substantially match the contours of the capsule 1.

Note that the foil member 5 as shown may not be exactly flat due to a defined over pressure inside the capsule, which over pressure is generated by introducing e.g. a protective gas when producing the filled capsule and/or by gas being released by the ingredients contained in the capsule. In particular with ground coffee, gas such as carbon dioxide is released after closure of the capsule at the production site which results in the foil member being deformed to a slightly convex shape.

According to invention, a flow control member 80 is placed between the ingredient 3 and the foil member 5.

The enclosing (bell) member 9 furthermore comprises a pressing surface 18 for applying a closure pressure on the rim area 8 of the capsule, an external thread 19 for mounting the bell member in a beverage production device and a water inlet opening 20 for feeding a liquid such as for example hot water under pressure to a water injector which is releasably mounted (screwed) to the bell member 9.

Note that the thread 19 is just an example for connection means, be it releasable or permanent connection means.

The other components of the beverage production device, such as e.g. the mechanism for displacing the bell member and eventually also the capsule holder are known from the prior art in the field of capsule-based espresso machines.

The water injector comprises perforation element(s) (blade, pin, etc.) 24 designed to produce an opening in the top wall 17 of the capsule 1 when the capsule holder 13 and the bell member 9 are moved close together e.g. by a manually operated or an automatic mechanism. A channel (not shown in the drawings) traverses the perforation element 24 such that water can be fed to the interior of the capsule 1 once the perforation element 24 protrudes into the interior of the capsule 1.

The capsule 1 comprises said top wall 17, a sidewall 7 and a flange-like rim 6, wherein the foil member 5 is sealed to said flange-like rim 6 to close-off hermetically the cup-like base body 4 of the capsule 1. Again, other designs for the capsule are possible as long as the capsule can be sealed and contain the mentioned ingredients.

Figure 3:
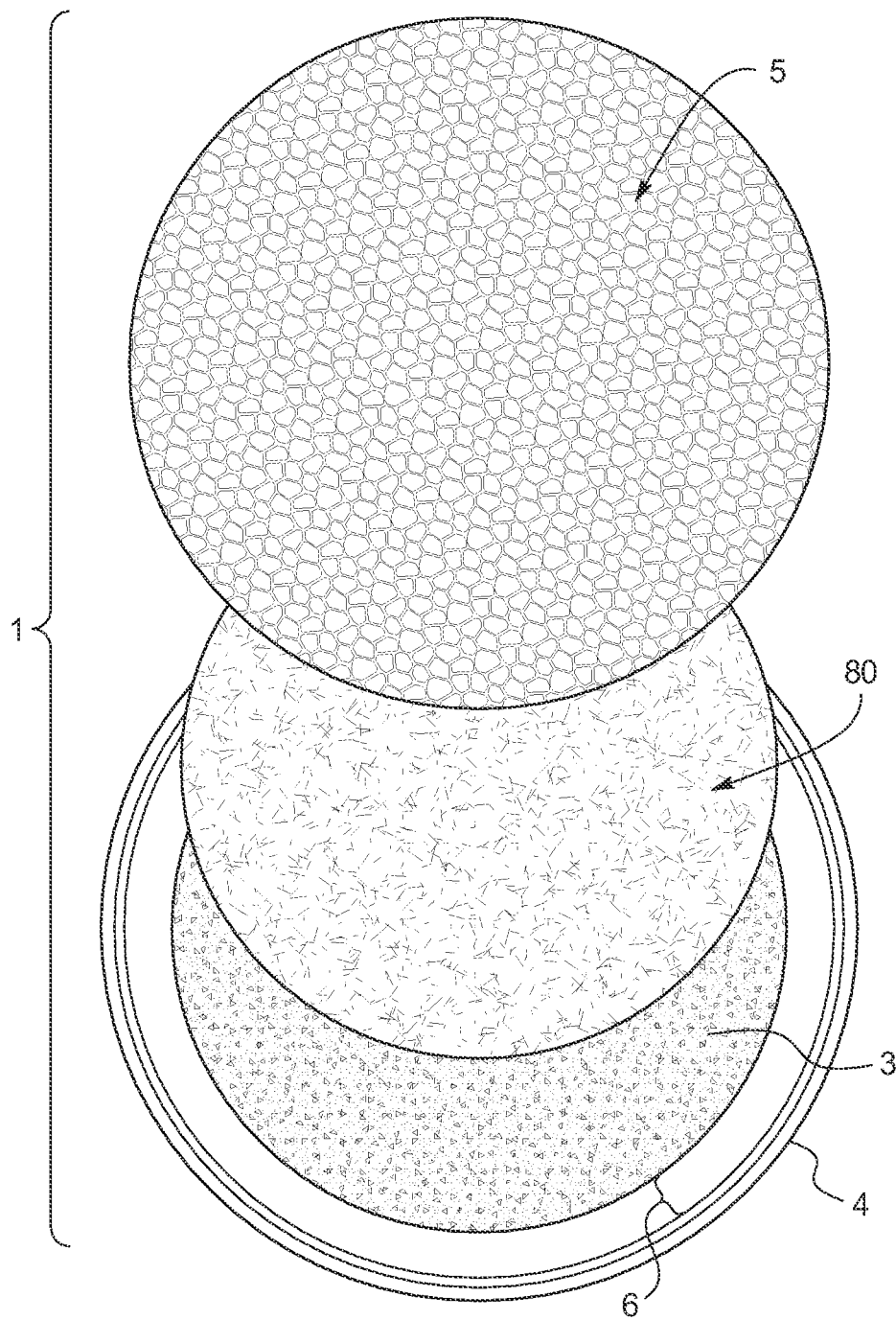
FIG. 3 shows a capsule according to the present invention with a removed foil member and a removed porous member.

FIG. 3 shows a capsule 1 where the aluminum or aluminium alloy foil member 5 before it is sealed onto the base body 4, and the flow control porous member 80 inserted between the bed 3 of ingredient and the foil 5.

Also the flange-like rim 6 of the base body of the capsule 1 is visible.

Further on, a flow control porous member 80 is shown. The flow control porous member 80 is an example of a filtering web made out of a non-woven material. It is preferably made of polymer such as polypropylene, polyethylene, polybutyleneterephtalate (PBT), polycarbonate, poly(4-methyl pentene-1), polyurethane, polyethyleneterepthalate (PET), polyethersulfone, polyamide or any other meltable fibrous polymers. Its pore size may range of from 0.4 to 100 microns, more precisely of from 0.4 to 30 microns, more precisely of from 0.4 to 20 microns, even more precisely between 0.4 and 10 microns, even more precisely between 0.4 and 2 microns. The filter disk can be reinforced, e.g. by a non-woven or woven material such as polyester.

Figure 4:
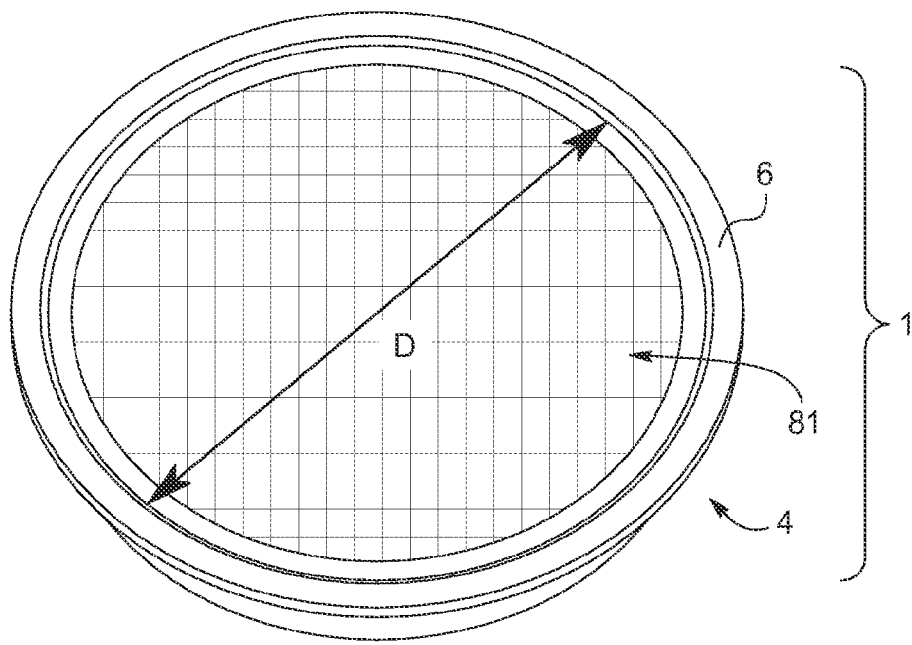
FIG. 4 shows a detail of a capsule according to the present invention.

FIG. 4 shows a flow control porous member 81 which has been cut into the proper dimensions and which can then be sealed, together with the aluminum foil member, e.g. via ultrasonic welding, to the flange-like rim 6 of the capsule 1. Since the porous member is made of meltable polymer(s), its welding to the capsule is so made possible. Preferably the flow control porous member dimensions are such that the edge of the flow control porous member overlap the flange-like rim 6 of base body 4 of the capsule 1.

Figure 5:
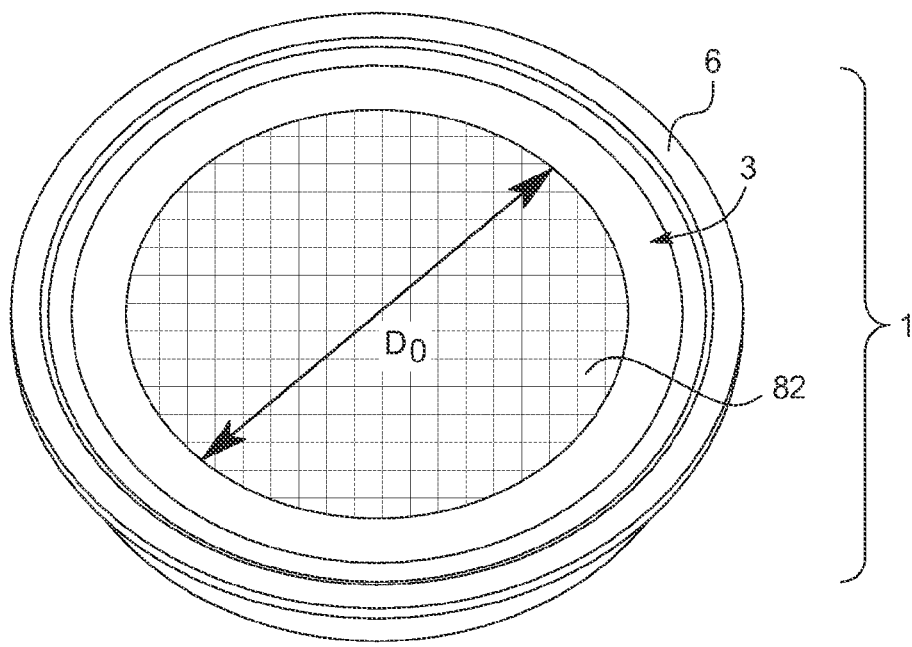
FIG. 5 shows a modification of the capsule of claim 4.

FIG. 5 shows the example of a flow control porous member 82 which has been cut into the proper dimensions, preferably slightly smaller diameter "D0" than the inner diameter "D" of the base body of the capsule. Therefore the edges of the flow control porous member do not reach to the walls of the capsule and the flow control porous member is then simply placed on the ingredients already filled in the capsule beforehand. Finally the foil member 5 is attached, for example heat or ultrasonically sealed, to the flange-like rim 6 of the capsule 1.

The flow control porous member and the tearable member can also form a multilayer laminate to facilitate handling during production of the capsule. In this case, the flow control member is necessarily provided as the innermost layer or multilayer in the capsule relative to the tearable foil member. The flow control member can be formed of a porous mono- or multilayer membrane laminated to a mono- or multilayer non-porous tearable foil. The non-porous tearable foil member is hence chosen in a material which provides controllable and reproducible tearing conditions. A preferred material is aluminium. The thickness of the aluminium layer is preferably of from 20 to 50 microns. The aluminium may further be laminated with one or more layers of non porous polymer layer such as a thermofusible lacquer. The additional layer may be of lower thickness (e.g., less than 5 microns) and be suitable for sealing to the capsule's body and porous layer.

The flow control member is preferably chosen in a material having a higher tear strength than the one of the tearable foil member when the foil member is opened, i.e., torn by the relief member 12 under the effect of the internal pressure, the porous member stretches sufficiently to resist to tearing under the pressurized extraction conditions. In particular, the flow control member is resilient enough to deform without breaking or forming enlarged passages for the flow of liquid. The liquid is so forced under pressure to pass through the many pores of the flow control member then to the perforations provided through the foil member as this one tears against the relief member.

As aforementioned, the porous member is preferably a mono-layer or a multilayer chosen among: polypropylene, polyethylene, PBT, polycarbonate, poly(4-methyl pentene-1), polyurethane, PET, polyethersulfone, polyamide, resin bonded-glass fibres and combinations thereof.

Figure 6:
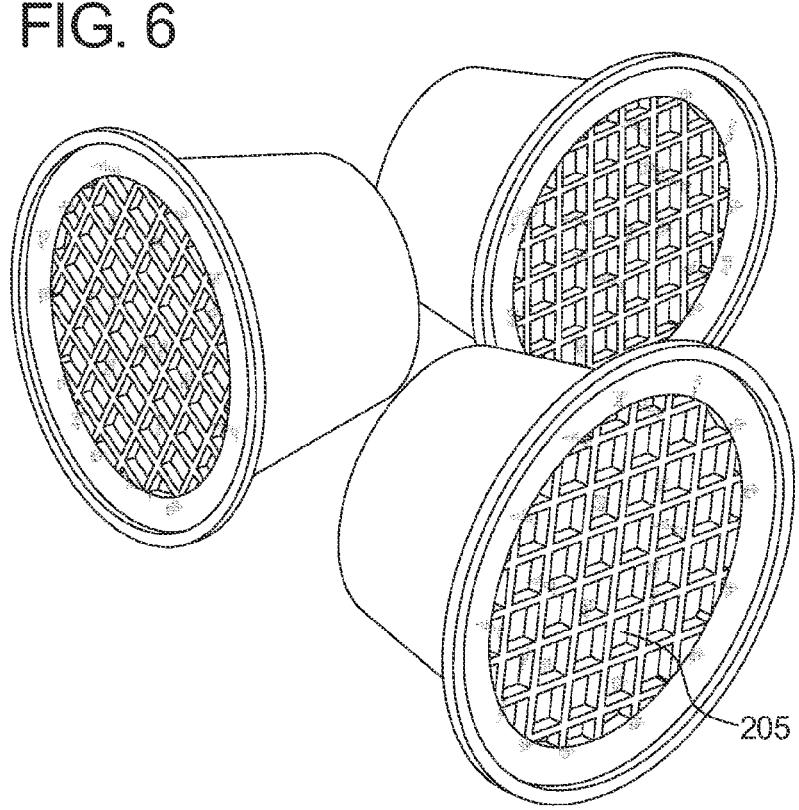
FIG. 6 illustrates a photographic illustration of the effect of the present invention on a perforated capsule after coffee extraction without flow control porous member.
Figure 7:
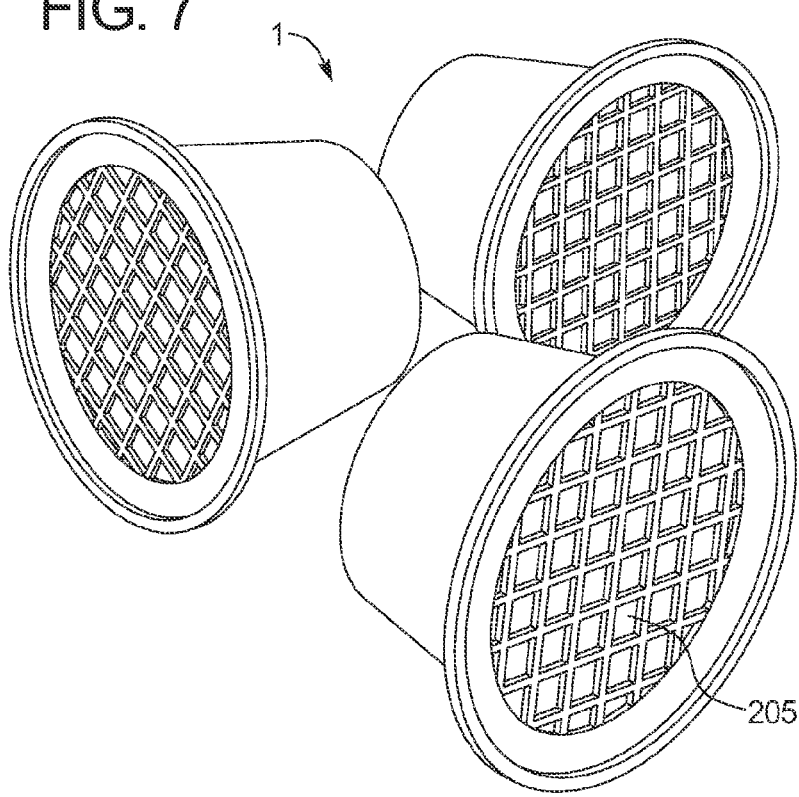
FIG. 7 illustrates a photographic illustration of the effect of the present invention on a perforated capsule after coffee extraction, with flow control porous member (Invention)

FIGS. 6 and 7 illustrate the filtering effect of the present invention. As can be seen, the invention is particularly adapted to a grid-shaped perforation 205 of the foil member 5 of the capsule, wherein the grid is comprised by small essentially rectangular or squared imprints defining a plurality of perforations of the foil member obtained as a result of the brewing process. The perforation is provided by the relief elements 12 (FIG. 2 or 17) onto which the foil member extends and tears under the effect of the internal pressure during extraction. The tearing structure is formed of surfaces which are free of sharp angles or edges, i.e., angles of less than about 80 degrees.

FIG. 6 shows that there is resurgence of coffee particles through the perforation 205 in absence of the flow control member. FIG. 7 shows a significant improvement with no resurgence at all of solids with capsules of the invention.

Figure 8:
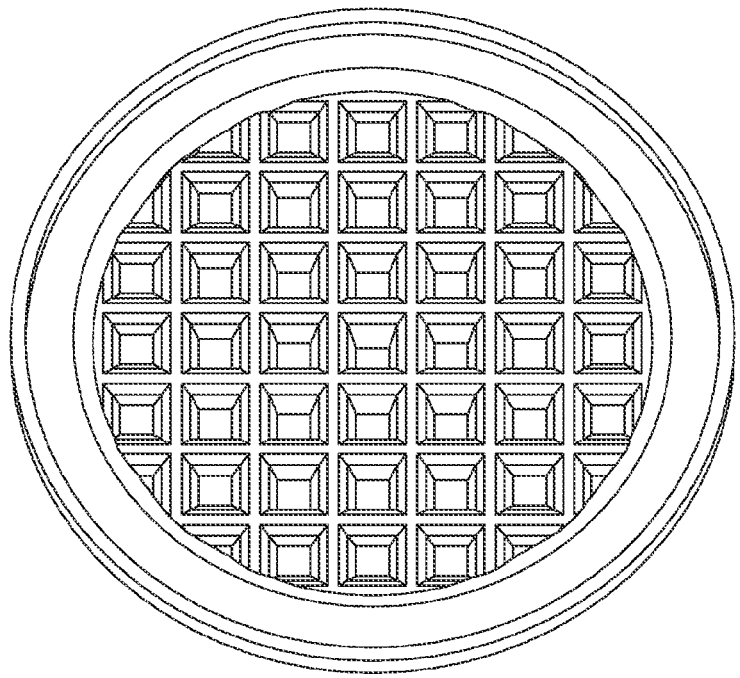
FIG. 8 illustrates another photographic illustration of the effect of the present invention on a perforated capsule after coffee extraction without flow control porous member.
Figure 9:
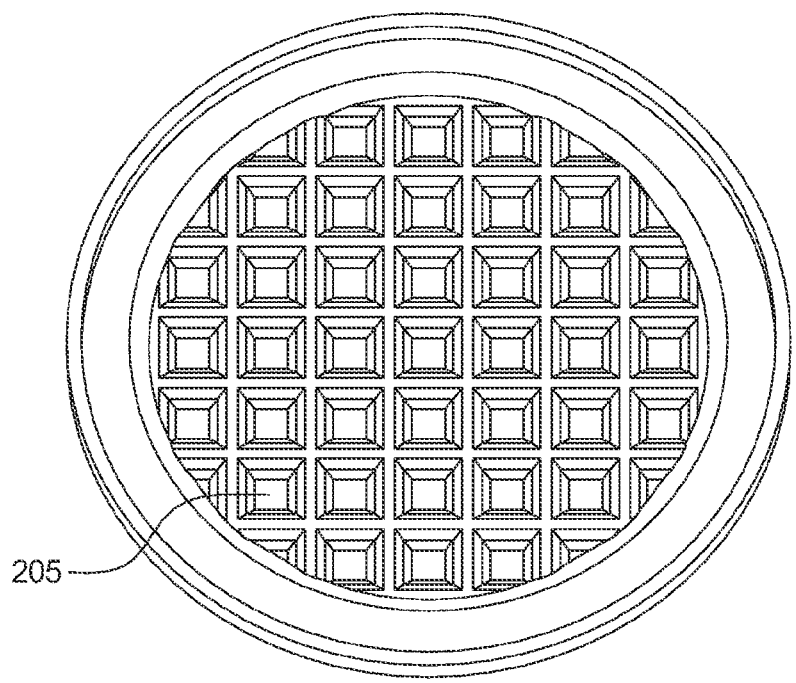
FIG. 9 illustrates another photographic illustration of the effect of the present invention on a perforated capsule after coffee extraction, with flow control porous member (Invention)

Surprisingly, FIGS. 8 and 9 show also a neater perforation 205 for the capsule of the invention. In other words, the perforations seem to be more consistent and of a more well defined profile. On FIG. 8, one can notice perforations of different size and depth.

It has been found out that the internal flow control porous member means according to the invention are particularly effective and suited in combination with an aluminium or aluminium alloy foil member 5 to be perforated in such a grid-like structure and with small openings 205.

In particular, the pressure drop during extraction under pressure of the coffee in the capsule is caused in the piping of the coffee machine, in the coffee bed, but primarily across the interface of the foil member and the puncture plate, i.e., the tearing structure.

The resulting time required to extract a certain amount of liquid depends therefore on the phenomena happening between the foil member and the puncture plate (i.e., "pyramid plate"). Without being bound by theory, the inventors think that the pressure drop occurring at the membrane-pyramid plate interface is mainly determined by the width of the gap between the membrane and "pyramid plate". The width of this gap is established at the beginning of extraction, particularly during the phase when the membrane ruptures. Very dynamic and to some extent chaotic phenomena can happen at this moment. Membrane physical strength (e.g. tensile strength, puncture resistance, elongation before rupture), rupture pressure and hydrodynamic behaviour of the water influence on how intense the membrane will be pressed against the pyramid plate and thus the gap width. Without the flow control porous member, these phenomena observed are more chaotic, thus leading to a fairly high variation of pressure drop and consequently to a high standard deviation of flow time. Additionally, very fine particles may be transported to this very narrow gap and obtrude the outlet, thus creating an increase in pressure drop.

The addition of a flow control porous member between the coffee bed and the foil member is supposed to act on the following 3 main phenomena determining the pressure drop:
a) Fine particles (i.e., particles of less than about 90 microns), which can be washed out from the coffee bed and transported to the outlet of the capsule are withhold by the flow control porous member. Therefore, they do not accumulate at the very narrow gap between the foil member and the puncturing plate. An increase due to obstruction by fine particles is therefore avoided.
b) The flow control porous member reduces the dynamic water pressure acting on the foil member at the moment of rupture at the beginning of extraction. The foil member is pressed against the puncture plate less intensely. Therefore, the gap between membrane and pyramid plate will be wider than without flow control porous member.
c) As the coffee bed creates a pressure drop during extraction, the resulting force is transmitted to the foil member and puncture plate. This force will further reduce the gap width between the foil member and the puncture plate. Through the rigidity of the flow control porous member however, the force will be distributed differently on to the foil member and puncture plate. The force will be higher on the plateau of the puncturing elements of the plate and lower in the grooves or channels of the plate. As the gap width relevant for pressure drop is mainly around the outlet holes located in the grooves, the reduction of the force transmitted by the coffee on the grooves will further reduce the pressure drop In a mode, the flow control porous member is not sandwiched between the foil member 5 and the rim 6 of the base body 4. The outer edge of the flow control porous member may end at a position radially inwards from the sealing area 209 of the foil member 5 and the rim of the base body.

Figure 14:
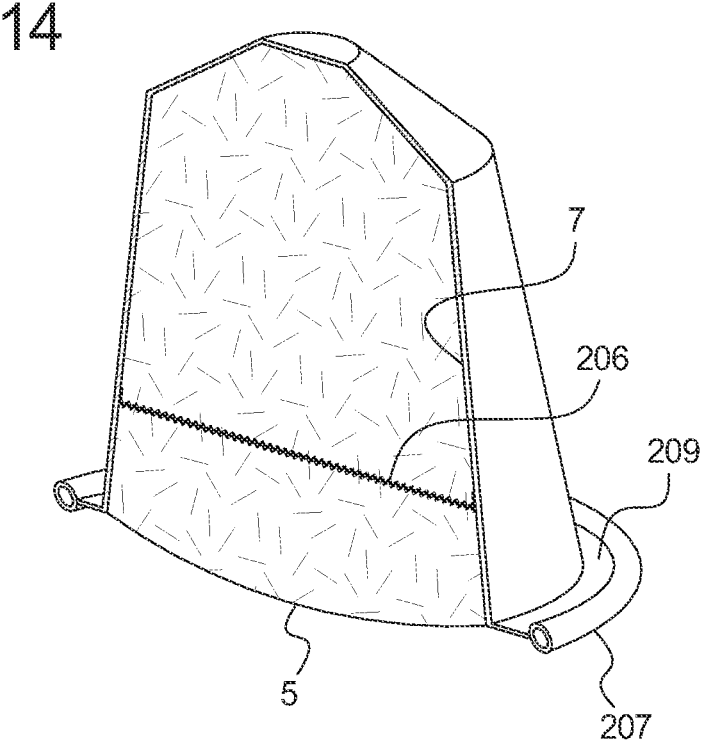
Figure 15:
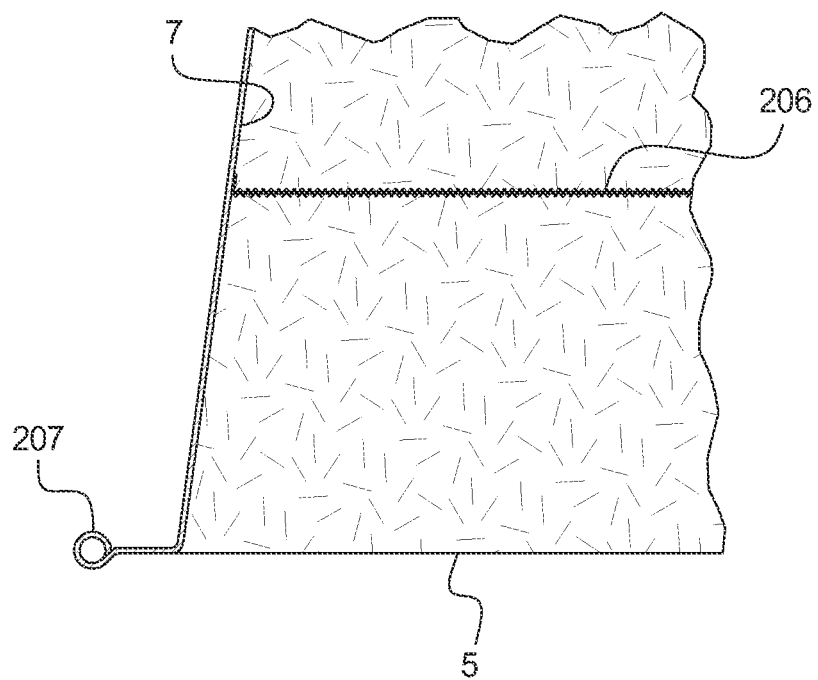

FIGS. 14 and 15 show that the internal flow control porous member means 206 can be distanced from the foil member 5. The flow control porous member 206 are respectively sealed to the walls 7 of the base body of the capsule. The flow control porous member can thus separate transversally with respect of the brewing direction two portions of ingredients, e.g., two ground coffee portions. The flow control porous member can thus regulate the flow of liquid between the two portions. Also, the portions of ingredient may have different characteristics such as a different granulometry or be different coffee blends.

In the embodiment of FIGS. 14 and 15, there are ingredients both above and below the flow control porous member 206.

The reference sign 207 designates the curled outer rim of the capsule. The foil member 5 and the rim flange of the base body can be sealed together in a ring-shaped area 209 inside and adjacent to the curled outer rim 207.

Figure 16:
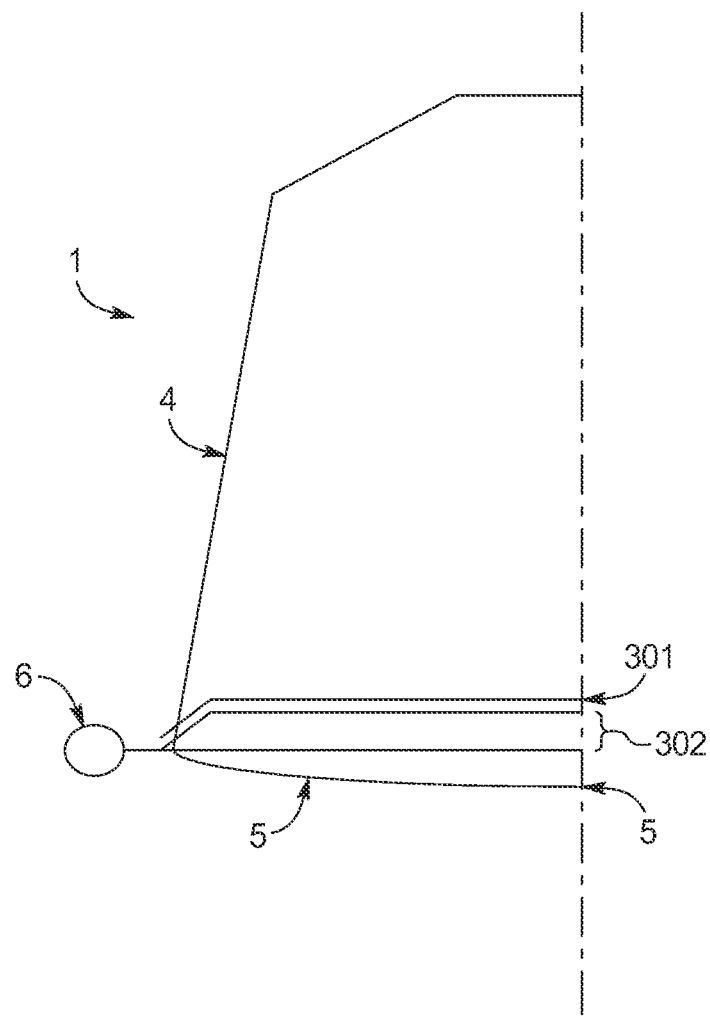
FIG. 16 shows a partial schematic view (Half view along a longitudinal median plane) of a capsule according to another embodiment.

FIG. 16 illustrates another possible mode for a capsule of the system of the invention. In this mode, the capsule comprises a cup-like base body 4, a closing foil 5 and a flange-like rim 6 of the body onto which is sealed an annular part of the closing foil. A flow control porous member 301 is placed in the capsule and is spaced from the inner surface of the foil member by a spacing element 302. The spacing element can be a grid with large holes or rigid member with channels and through holes providing significantly no pressure drop.

Figure 17:
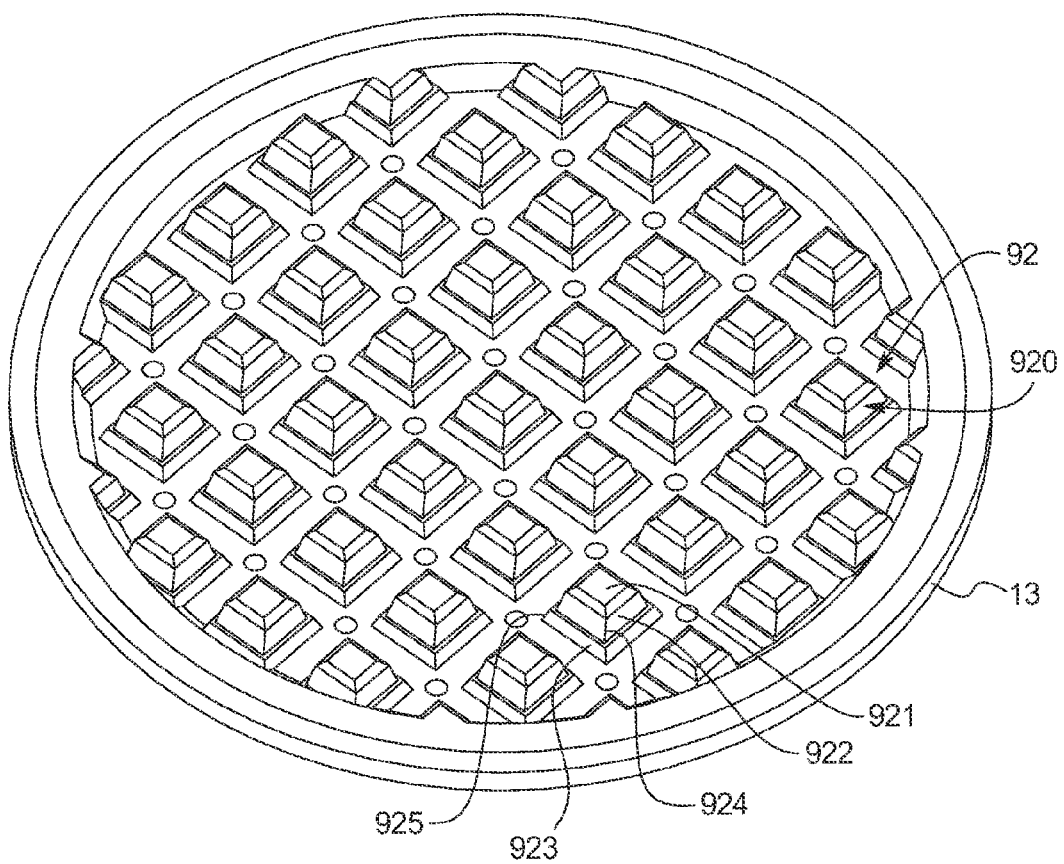
FIG. 17 shows a capsule holder of the device according to the system of the invention.

In view of FIG. 17, the relief elements of the capsule holder 13 are designed such that no angles of the relief element is below 80 degrees that could form sharp edges. Turning to FIG. 17, an example of a suitable capsule holder 13 is represented. The capsule holder 13 comprises a tearing structure 92 comprising a series of truncated pyramids 920 having substantially squared sections. The upper surface of the pyramids is basically a square surface 921 of smaller section than the base section 922 of the pyramids. The square surfaces 921 form the "plateau" of the tearing structure. The pyramid can comprise a lower base 923 of larger section than the base section 922. The number of pyramids can range of from about 25 to 50. The height of the pyramids can be of from about 0.5 to 3 mm. The tearing edges of the structure are mainly situated at the edge 924 of the upper surface 921 and at the edges 925 of the side walls of the pyramid. All the surfaces of the pyramids connect at the tearing edges by forming angles of more than 80 degrees. More preferably the upper tearing edges 924 are delimited by surfaces forming an angle of more than 90 degrees.

EXAMPLES

Example 1

Figure 10:
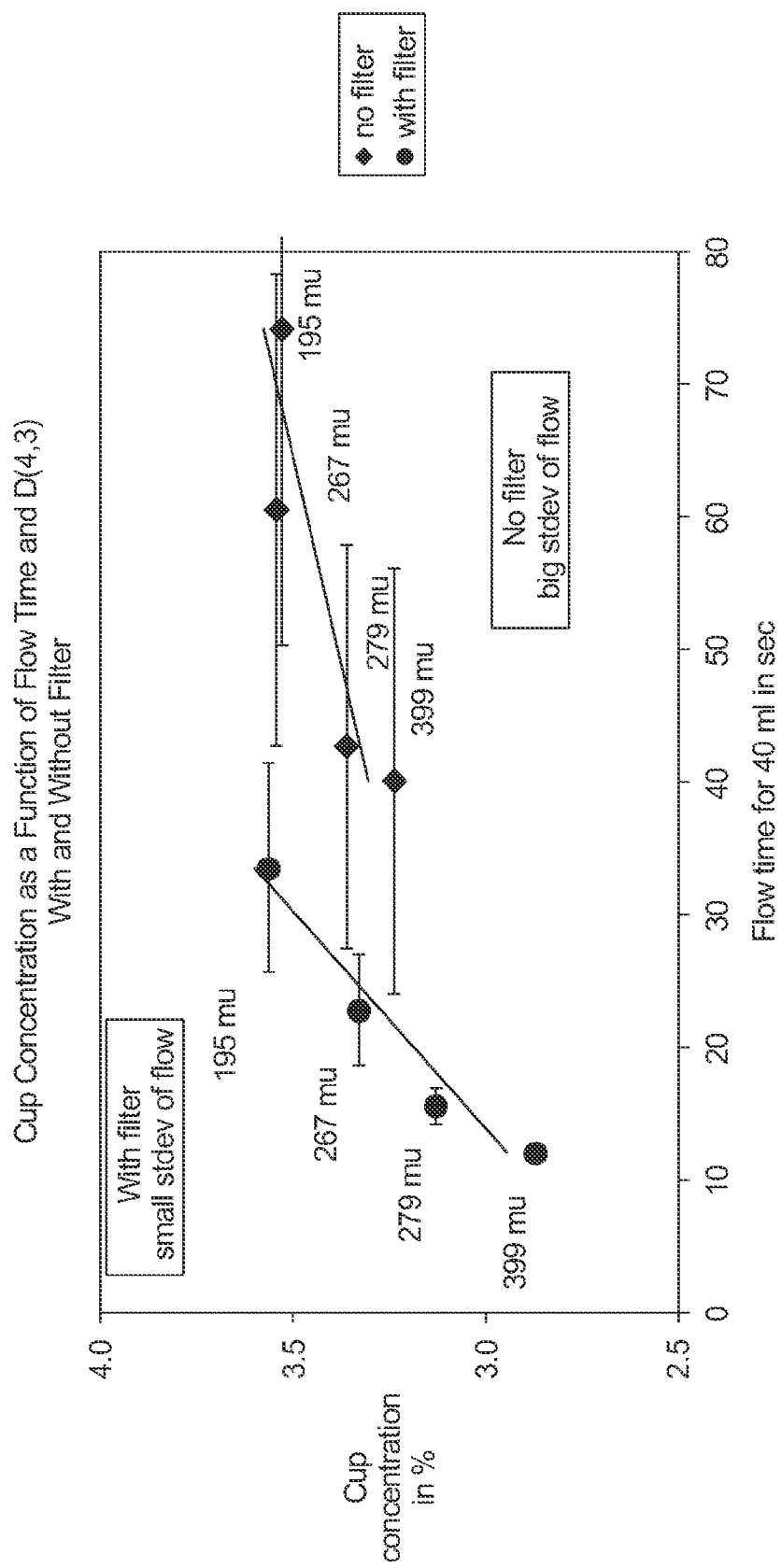
FIG. 10 shows comparative curves of the cup concentration, in percentage, as a function of the flow time, in seconds, for a cup of espresso-type coffee weighting 40 grams.

Flow Time For Short Coffee (40 grams):

FIG. 10 shows comparative curves of the coffee cup concentration as a function of the flow time (in seconds) for delivery of 40 mL of coffee extract, for respectively capsules without flow control porous member and capsules according to the invention with a flow control porous member. The curves show the results on the standard deviation of flow times for different granulometries, respectively, 195, 267, 279 and 399 microns (Coffee ground in a Probat grinder). The capsule contained 5.5 grams of ground coffee and a porous member made of a microfibre-containing web, "Innovatec SAP489" (Specific weight of 50 g/m2), made of polyurethane. The porous member of a diameter of about 33 mm was placed adjacent the foil member. The foil member of the capsule had a thickness of 30 microns. The capsules were extracted in a "Nespresso Concept®" machine.

The results show a relatively lower flow time and less standard deviation for the capsule of the invention compared to capsule having no such flow control and filtering member. Surprisingly, it is also possible to create a wider range in coffee concentration in the cup depending on the granulometry, for example, in this specific example, a concentration ranging from about 2.8 to 3.6% in weight. The numerical results are also provided in the following table.

| | | Flow times to obtain 40 ml of coffee extract | | | | | |
|---|---|---|---|---|---|---|---|
| | Average | Without flow control porous member | | | With flow control porous member | | |
| Capsule load (g) | particle size (microns) | Average flowtime (s) | Standard deviation (s) | Standard deviation (%) | Average flowtime (s) | Standard deviation (s) | Standard deviation (%) |
| 5.5 | 195 | 74 | 24 | 32% | 34 | 8 | 23% |
| 5.5 | 267 | 60 | 18 | 29% | 23 | 4 | 18% |
| 5.5 | 279 | 43 | 15 | 35% | 16 | 1 | 8% |
| 5.5 | 399 | 40 | 16 | 40% | 12 | 1 | 7% |

Example 2

Figure 11:
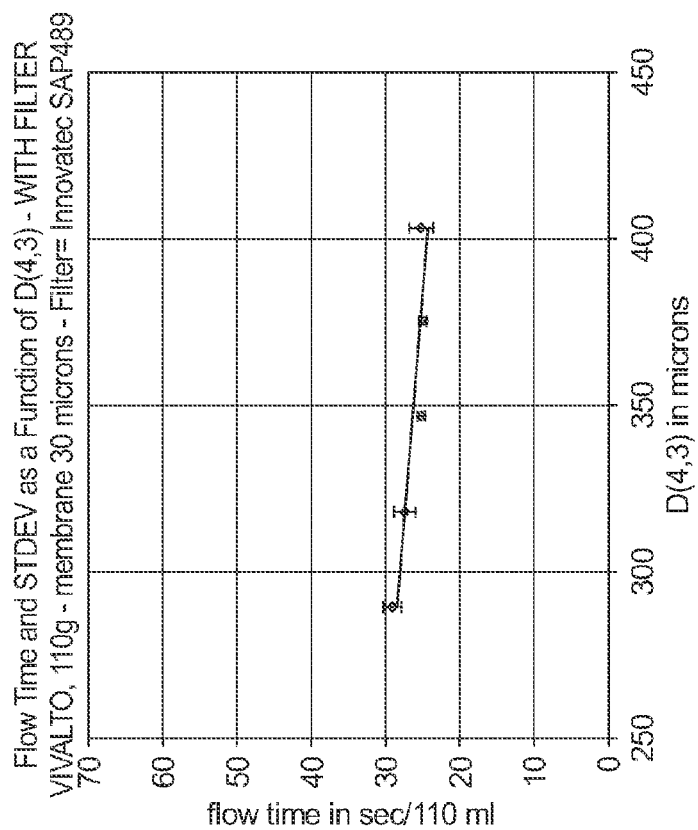
FIG. 11 shows the evolution of the flow time in seconds as a function of the coffee average particle size ($D_{4,3}$) for a long cup ("lungo") cup of coffee weighting 110 grams with capsules having no flow control porous members.
Figure 12:
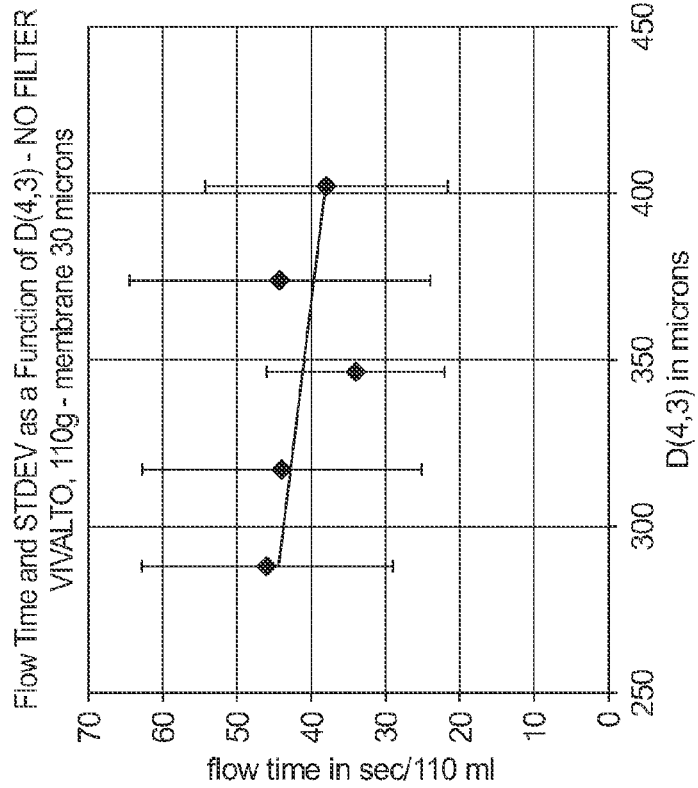
FIG. 12 shows the evolution of the flow time in seconds as a function of the coffee average particle size ($D_{4,3}$) for a long cup ("lungo") cup of coffee weighting 110 grams with capsules having a flow control porous members (Invention)

Flow Time For Long Coffee (110 grams):

FIGS. 11 and 12 show a comparative evolution of the flow time as a function of the particle size $D_{4,3}$ for delivering a lungo coffee extract of 110 grams from capsules containing about 6 grams of coffee and having a foil member of about 30 microns. The porous member of a diameter of about 33 mm was placed adjacent the foil member. It is surprisingly noticed that the flow time is significantly reduced below 30 seconds for particle size in the range of from 289 to 403 microns (More particularly, for respectively 289, 318, 347, 375 and 403 microns). It is also remarkable to note that the flow time standard deviation is significantly decreased to less than 5 seconds for all particles sizes. The capsules were extracted in a "Nespresso Concept®" machine.

The following table 1 provides results of the tests on capsules with or without flow control porous member (called "filter") corresponding to FIGS. 11 and 12.

TABLE 1

| Filter type | R&G D(4, 3) [μm] | Flow type | Flow time [sec] | Flow rate [g/min] | TC extract % | Extraction yield % |
|---|---|---|---|---|---|---|
| No filter | 289 | slow | 50 | 133 | 1.4 | 26.2 |
| | | fast | 36 | 185 | 1.4 | 25.9 |
| | 318 | slow | 53 | 124 | 1.4 | 25.2 |
| | | fast | 30 | 217 | 1.3 | 24.4 |
| | 347 | slow | 43 | 153 | 1.3 | 24.2 |
| | | fast | 26 | 258 | 1.2 | 23.4 |
| | 375 | slow | 61 | 108 | 1.3 | 24.2 |
| | | fast | 27 | 243 | 1.2 | 22.5 |
| | 403 | slow | 51 | 131 | 1.3 | 22.8 |
| | | fast | 26 | 258 | 1.2 | 22.3 |
| with filter | 289 | slow | 30 | 220 | 1.4 | 26.1 |
| | | fast | 28 | 236 | 1.4 | 26.1 |
| | 310 | slow | 28 | 236 | 1.3 | 24.4 |
| | | fast | 26 | 252 | 1.3 | 24.7 |
| | 347 | slow | 26 | 259 | 1.2 | 23.5 |
| | | fast | 25 | 267 | 1.2 | 23.4 |
| | 375 | slow | 25 | 262 | 1.2 | 22.7 |
| | | fast | 25 | 268 | 1.2 | 22.6 |
| | 403 | slow | 25 | 263 | 1.2 | 22.5 |
| | | fast | 25 | 269 | 1.2 | 22.0 |

Coffee: VIVALTO - 6 g R&G per capule
Capsule: NC Al membrane 30 microns
Filter: diameter 33 mm
Extraction machine: Pelican ref.
Cup: size 110 g-24 extractions Example 3

Figure 13:
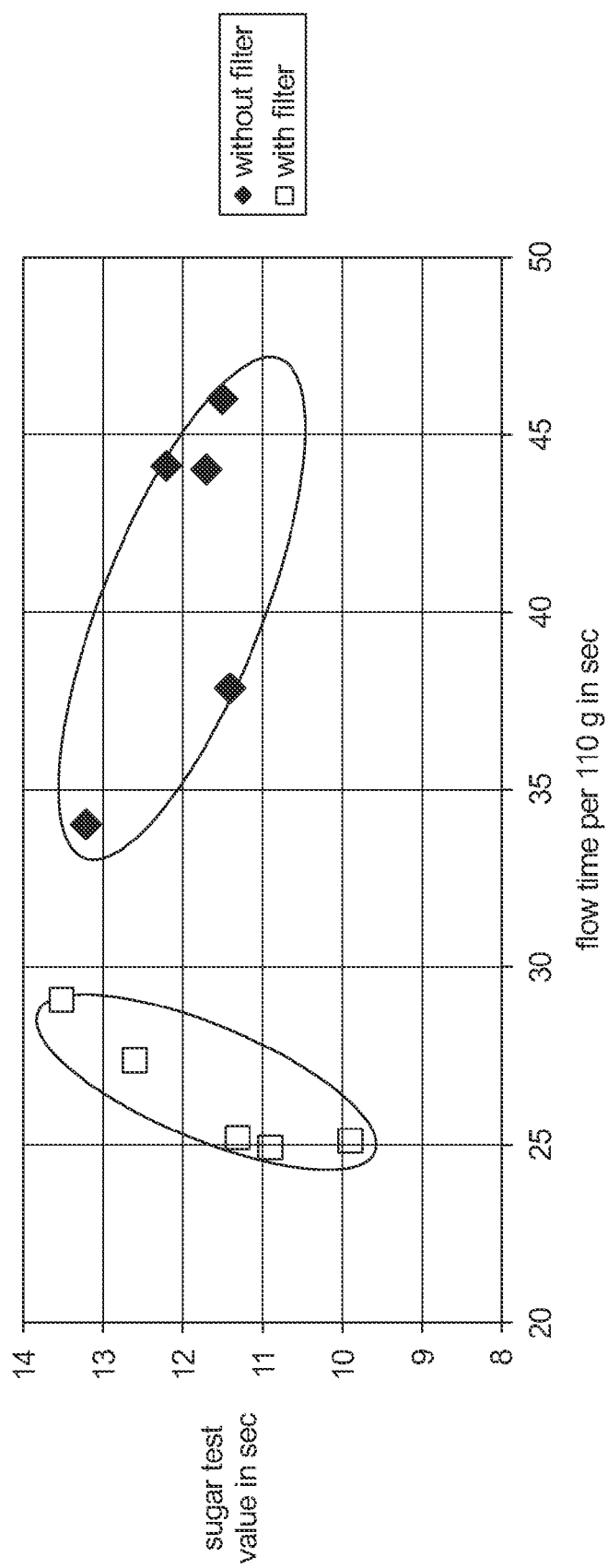
FIG. 13 shows the "crema" value as a function of the flow time for a lungo coffee cup with and without flow control porous member in the capsule and, FIGS. 14 and 15 show views of a cut capsule according to variants of the capsule of the present invention.

Crema Results:

FIG. 13 shows the results on the results on crema formation using capsules of the invention and comparatively capsules with no flow control porous member. The curves are comparative curves of the "crema" (time in seconds for "sugar test") as a function of the flow time for delivering 110 grams of coffee extract in seconds. The capsule contained 6 grams of ground coffee and a porous member made of microfibrous "Innovatec SAP489" web in polyurethane. The foil member had a thickness of 30 microns. The results clearly show that the flow control porous member does not affect the crema formation whereas the flow time is significantly reduced.

For the example of FIG. 13, crema is measured according to an empirical test called "sugar test". The procedure for this test is explained below.

Example 4

Flow Time For Long Coffee (110 grams) And Higher Mass Of Ground Coffee (6.2 grams):

A comparative test was run for capsules with or without flow control member made of membrane of nylon 6,6, "Ultipor N6,6 Posydine" from PALL Company of 0.65 microns and 33 mm of diameter. The capsules contained 6.2 grams of ground coffee having particle size $D_{4,3}$ of 320 microns. The porous member of a diameter of about 33 mm was placed adjacent the foil member. For capsules with the Nylon membrane, the flow time was comprised between 33 and 37 seconds with an average flow time of 34 seconds. The coffee yield was measured between about 22 and 23%. Comparatively, capsules of the same characteristics but without flow control porous member exhibited a flow time between 24 and 72 seconds with an average flow time of 49 seconds. These results also show that for a higher mass of 6.2 grams, the flow time is reduced in average and the flow consistency is very much improved with capsules of the invention.

Example 5

Flow Time For Different Flow Control Porous Members:

The following table provides results on flow time for different other porous member tested from PALL Company. The reference was a capsule with no porous member inside. This result shows that the flow time is improved for porous members of between 0.45 to 100 microns. The coffee yield was comprised between about 22 and 23%.

| Porous member | Type | Pore size [μm] | flow-time in sec/110 ml |
|---|---|---|---|
| HDC II | Polypropylene | 0.60 | 26 |
| HDC II | Polypropylene | 20.00 | 20 |
| Preflow UB | Resin-bonded glass fiber | 0.45 | 28 |

-continued

| Porous member | Type | Pore size [μm] | flow-time in sec/110 ml |
|---|---|---|---|
| Ultipor GF Plus | Resin-bonded glass fiber | 1.00 | 29 |
| Ultipor N6,6 | Nylon 6,6 | 0.65 | 32 |
| Ultipor N6,6 Posidyne | Nylon 6,6 | 0.65 | 27 |
| Reference | | | 42 |
| Coffee Blend, | D4,3 of 400 microns | | |

Example 6

Sugar Test For Crema Determination:

The mechanised sugar test device is composed of a small sugar-containing silo. The prismatic V-shape of this silo comprising a defined slit (2 mm×40 mm) at the bottom edge can create a uniform sugar curtain as long as the slit is free and a minimum of sugar remains in the silo. This silo can be moved horizontally, with controlled speed (~40 mm/s) from one point "A" to a point "B" (distance between A and B is 20 cm). In the end position at both points a baffle prevents the sugar from flowing out if the device is in stand-by mode. When the silo is moved, the sugar curtain is produced all the way between the two points "A" and "B". The crema in a cup that is placed at 60 mm below this path within the two points will be topped with a uniform layer of sugar when the silo passes over it. The chronograph is started when the sugar layer is positioned on the foam's layer. The amount of sugar (a thickness of the layer to obtain a precise weight of 5 g of sugar) deposed in the cup is adjustable by varying the speed of the silo or the dimensions of the slit. The sugar is crystal sugar of $D_{4,3}$ equal to 660 microns. A precise waiting period (20 sec. for small cups) must be observed between the end of extraction and the start of the sugar test. The sugar layer remains some time on top of the crema. Later, when the main part of the sugar sinks suddenly the observing operator must stop the chronograph.

The "sugar test value" is the number of seconds shown by the chronograph. Additional information as to this test can be found in EP1842468B1.

The invention claimed is:

1. A capsule for use in a beverage production machine, the beverage production machine comprising a member that perforates an inlet side of a body of the capsule opposed to a foil member and a flange-like rim and injects a liquid or a liquid/gas mix into the capsule; and a relief plate having a multitude of relief elements, the relief plate is positioned in the machine such that injection pressure urges the foil member against the relief plate; and the capsule comprising:

a base body sealed off by the foil member tightly attached to the flange-like rim of the base body, the foil member (i) having a thickness between 15 and 45 microns, (ii) being constructed from a material selected from the group consisting of aluminum, aluminum alloy, a laminate of aluminum and a polymer, a laminate of aluminum alloy and a polymer, and combinations thereof, and (iii) when perforated by the relief plate, forms a multitude of openings when the pressure of the injected liquid or liquid/gas mixture reaches a value of at least 4 bar, wherein the base body contains ground coffee having a particle size between 190 and 400 microns; and a flow control porous member positioned between at least a portion of ingredients in the capsule and the foil member, the flow control porous member having a pore size of between 0.4 and 2 microns, wherein the porous member is made of at least one thin polymeric membrane having a thickness between 0.4 microns and 1.0 mm, and is made of a material selected from the group consisting of polypropylene, polyethylene, PBT, Nylon, polycarbonate, poly(4-methyl pentene-), polyurethane, PET, polyethersulfone, polyamide, resin bonded-glass fibers and combinations thereof.

2. The capsule of claim 1, wherein a thickness ratio of the flow control porous member to the foil member is between 5:1 and 20:1.

3. The capsule of claim 1, wherein the flow control porous member is thicker than the foil member.

4. The capsule of claim 1, wherein the flow control porous member comprises essentially polymeric fiber-containing material and is made from a woven and/or non-woven material.

5. The capsule of claim 1, wherein the flow control porous member is adjacent to the foil member.

6. The capsule of claim 5, wherein the foil member and the flow control porous member form a multilayer laminate.

7. The capsule of claim 1, wherein the flow control porous member has a shape selected from the group consisting of square and rectangular.

8. The capsule of claim 1, wherein the flow control porous member comprises microfibres of a diameter less than 20 microns.

9. The capsule of claim 1, wherein the base body is made from a material selected from the group consisting of aluminum, aluminum alloy, a laminate of aluminum and a polymer, a laminate of aluminum alloy and a polymer, and combinations thereof.

* * * * *